US012436253B1

(12) United States Patent
El Dokor et al.

(10) Patent No.: US 12,436,253 B1
(45) Date of Patent: Oct. 7, 2025

(54) COARSE TO FINE MOVEMENT DETECTION IN VEHICLES

(71) Applicant: Edge 3 Technologies, Inc., Phoenix, AZ (US)

(72) Inventors: Tarek El Dokor, Phoenix, AZ (US); James Holmes, Mesa, AZ (US)

(73) Assignee: Edge 3 Technologies, Phoenix, AZ (US)

( * ) Notice: Subject to any disclaimer, the term of this patent is extended or adjusted under 35 U.S.C. 154(b) by 0 days.

(21) Appl. No.: 17/857,025

(22) Filed: Jul. 3, 2022

Related U.S. Application Data

(63) Continuation of application No. 16/541,096, filed on Aug. 14, 2019, now Pat. No. 11,378,671.

(51) Int. Cl.
*G01S 13/04* (2006.01)
*B60N 2/00* (2006.01)
*G01S 7/35* (2006.01)
*G01S 13/50* (2006.01)
*G01S 13/88* (2006.01)

(52) U.S. Cl.
CPC ............ *G01S 13/04* (2013.01); *B60N 2/0022* (2023.08); *B60N 2/0029* (2023.08); *B60N 2/0033* (2023.08); *G01S 7/354* (2013.01); *G01S 13/50* (2013.01); *G01S 13/88* (2013.01)

(58) Field of Classification Search
CPC ......... B60N 2/002; G01S 13/04; G01S 13/50; G01S 13/931; G01S 13/88; G01S 13/56; G01S 7/354; G01S 7/41; G01S 7/415; G01S 7/539; G01S 7/4802

USPC .......................................................... 342/28
See application file for complete search history.

(56) References Cited

U.S. PATENT DOCUMENTS

| | | | | |
|---|---|---|---|---|
| 6,445,988 B1 * | 9/2002 | Breed | ............... | B60R 21/01532 180/268 |
| 6,753,780 B2 * | 6/2004 | Li | ........................ | B60N 2/0029 340/573.1 |
| 7,036,390 B2 * | 5/2006 | Tsuchihashi | ............ | G01S 13/56 73/865.9 |
| 7,468,034 B2 * | 12/2008 | Ouchi | ..................... | A61B 5/024 600/300 |
| 8,358,234 B2 * | 1/2013 | Mohamadi | ............... | G01S 7/415 342/28 |
| 8,368,586 B2 * | 2/2013 | Mohamadi | ............... | G01S 7/412 342/21 |
| 8,405,544 B2 * | 3/2013 | Nakagawa | ............ | G01S 13/937 342/146 |

(Continued)

FOREIGN PATENT DOCUMENTS

DE 102018202903 A1 * 8/2019 ............. G01S 7/354

*Primary Examiner* — Michael W Justice
(74) *Attorney, Agent, or Firm* — Gordon Kessler

(57) ABSTRACT

A system and method for identifying the presence of an occupant in a vehicle. The system includes a first sensor positioned within a seating area of a seat and having a corresponding sensitive zone passing through the seating area vertically, and a second sensor positioned within a back rest area of the seat and having a corresponding sensitive zone passing through a chest area of an occupant horizontally. The first sensor is adapted to sense coarse movements adjacent to and farther from the sensor while the second sensor is adapted to capture both coarse and finer movements, such as breathing and heartbeats.

5 Claims, 7 Drawing Sheets

(56) References Cited

U.S. PATENT DOCUMENTS

| | | | | |
|---|---|---|---|---|
| 8,754,772 B2* | 6/2014 | Horng | | A61B 5/113 340/539.1 |
| 9,176,223 B2* | 11/2015 | Derham | | G01S 13/04 |
| 9,272,689 B2* | 3/2016 | Fung | | G07C 9/37 |
| 9,671,492 B2* | 6/2017 | Diewald | | B60R 21/01534 |
| 9,848,814 B2* | 12/2017 | Benson | | B60N 2/0024 |
| 9,862,271 B2* | 1/2018 | Branković | | A61B 5/6893 |
| 9,865,150 B2* | 1/2018 | Branković | | G01S 7/03 |
| 10,310,087 B2* | 6/2019 | Laddha | | G01S 7/4808 |
| 10,322,728 B1* | 6/2019 | Porikli | | G06V 10/80 |
| 10,401,479 B2* | 9/2019 | Mabrouk | | G01S 13/52 |
| 10,495,725 B2* | 12/2019 | Zhang | | G01S 13/003 |
| 10,620,307 B2* | 4/2020 | Yavari | | G01S 13/86 |
| 10,677,905 B2* | 6/2020 | Baheti | | G01S 13/04 |
| 10,953,850 B1* | 3/2021 | Pertsel | | B60R 21/01538 |
| 10,967,824 B1* | 4/2021 | Pertsel | | B60R 21/01538 |
| 11,412,937 B2* | 8/2022 | Ahmad | | A61B 5/1135 |
| 11,733,386 B2* | 8/2023 | Banerjee | | G01S 13/865 342/54 |
| 11,793,914 B2* | 10/2023 | Wiktor | | G16H 20/40 |
| 2004/0020314 A1* | 2/2004 | Tsuchihashi | | G01S 13/56 340/459 |
| 2006/0217612 A1* | 9/2006 | Ouchi | | G01S 13/88 600/407 |
| 2008/0234568 A1* | 9/2008 | Ouchi | | A61B 5/024 600/407 |
| 2010/0295718 A1* | 11/2010 | Mohamadi | | G01S 7/026 342/21 |
| 2011/0025547 A1* | 2/2011 | Mohamadi | | G01S 7/003 342/22 |
| 2011/0240750 A1* | 10/2011 | Tokura | | G01S 13/56 236/51 |
| 2011/0298651 A1* | 12/2011 | Nakagawa | | G01S 7/023 342/146 |
| 2012/0209087 A1* | 8/2012 | Horng | | A61B 5/11 600/301 |
| 2013/0176161 A1* | 7/2013 | Derham | | G01S 13/04 342/27 |
| 2015/0369911 A1* | 12/2015 | Mabrouk | | G01S 13/888 342/159 |
| 2016/0200276 A1* | 7/2016 | Diewald | | G01S 13/56 342/28 |
| 2016/0354027 A1* | 12/2016 | Benson | | B60N 2/976 |
| 2017/0036541 A1* | 2/2017 | Brankovic | | A61B 5/6893 |
| 2017/0039835 A1* | 2/2017 | Brankovic | | H01Q 19/108 |
| 2017/0123058 A1* | 5/2017 | Yavari | | G01S 13/86 |
| 2018/0279884 A1* | 10/2018 | Ahmad | | G01S 13/88 |
| 2018/0348374 A1* | 12/2018 | Laddha | | G01S 17/931 |
| 2019/0094350 A1* | 3/2019 | Baheti | | G01S 7/415 |
| 2019/0178980 A1* | 6/2019 | Zhang | | A61B 5/7267 |
| 2019/0239815 A1* | 8/2019 | Gallagher | | G01S 7/415 |
| 2020/0005060 A1* | 1/2020 | Martin | | G06V 40/197 |
| 2020/0233061 A1* | 7/2020 | Lang | | B60W 40/02 |
| 2020/0301013 A1* | 9/2020 | Banerjee | | G01S 17/931 |
| 2020/0383580 A1* | 12/2020 | Shouldice | | B60W 40/08 |
| 2021/0369928 A1* | 12/2021 | Wiktor | | G16H 20/40 |
| 2022/0252714 A1* | 8/2022 | Kitamura | | G01S 7/354 |

* cited by examiner

COARSE TO FINE MOVEMENT DETECTION IN VEHICLES

CROSS REFERENCE TO RELATED APPLICATIONS

This application is a continuation of U.S. patent application Ser. No. 16/541,096 titled "Coarse to fine movement detection in vehicles", filed Aug. 14, 2019 to El Dokor et al., which in turn claims the benefit of U.S. Provisional Patent Application Ser. No. 62/719,022 titled "Coarse to fine movement detection in vehicles", filed Aug. 16, 2018 to El Dokor et al., the entire contents thereof being incorporated herein by reference.

BACKGROUND

On average, 37 children die from heat-related deaths after being trapped inside vehicles. Even the best of parents or caregivers can unknowingly leave a sleeping baby in a car; and the end result can be injury or even death. By 2019, legislation (HOT CARS Act of 2016, H.R. 6041) calls for all passenger vehicles to be "equipped with technology to provide an alert that a child or unattended passenger remains in a rear seating position after the vehicle motor is deactivated."

The inventors of the present invention have determined that prior art methods fail to properly determine whether a child or other occupant remains in the car, regardless of their current activity.

It would therefore be beneficial to present a method and apparatus for overcoming the drawbacks of the prior art.

SUMMARY

The inventors of the present invention have therefore recognized that occupant monitoring has become a necessary safety feature for all modern automobiles to prevent accidental child and pet deaths due to unattended vehicles. It also serves as a deterrent for vehicle theft by detecting unauthorized entry in a vehicle.

The present invention preferably leverages low-power, and portable microwave and other millimeter wave doppler modules to create a topology of ambient sensing nodes that can not only reliably detect the presence of an active occupant in a vehicle detecting coarse movements but also detect a resting individual by detecting key biometric signatures like breathing and heartbeat.

Still other objects and advantages of the invention will in part be obvious and will in part be apparent from the specifications and drawings.

The invention accordingly comprises the several steps and the relation of one or more of such steps with respect to each of the others, and the apparatus embodying features of construction, combinations of elements and arrangement of parts that are adapted to affect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which.

DETAILED DESCRIPTION

One or more embodiments of the invention will now be described, making reference to the following drawings in which like reference numbers indicate like structure between the drawings.

The present invention preferably provides a system for recognizing that an occupant is still positioned within an automobile or other location. The system is able to make such a determination whether the occupant is moving, or doing nothing more than breathing. While the various embodiments of the present invention are described relative to a car, they may also be applicable to other forms of transportations, such as busses, planes, etc., and also to other locations where confirming the presence of a live being may be desirable.

Ambient Sensing Node

The main elements in the inventive solution comprise one or more ambient sensing nodes (ASN). Each ambient sensing node acts as a main modular sensing element of a system which consists of hardware components to sense motion and interfaces with a micro-controller unit to detect occupants. The sub-modules of such an inventive ASN constructed in accordance with one or more embodiments of the invention are described in detail below.

Microwave Doppler Module

Figure 1:
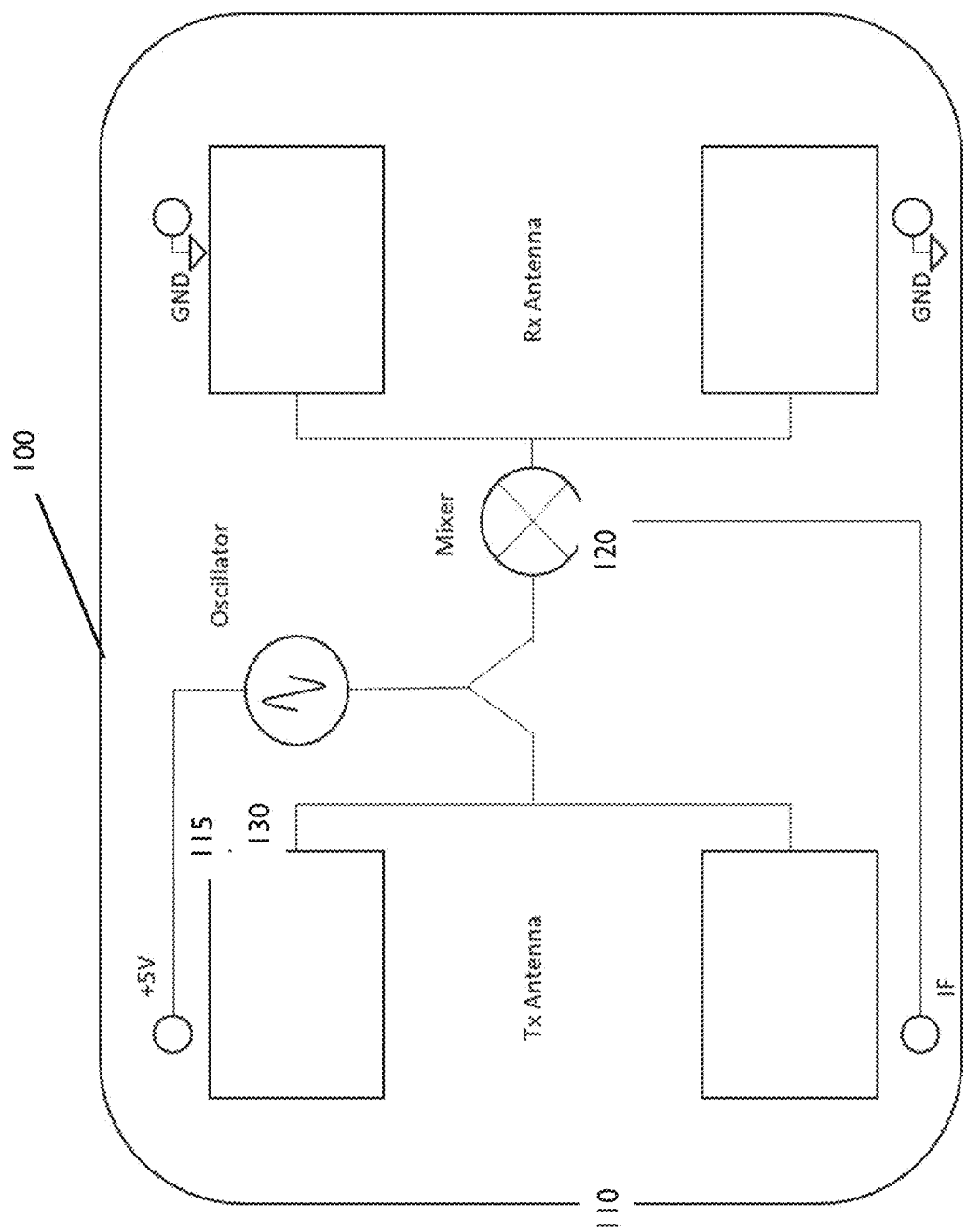
FIG. 1 is a block diagram depicting a microwave doppler node sensor constructed in accordance with an embodiment of the invention.

Referring first to FIG. 1, a block diagram for a doppler node sensor constructed in accordance with an embodiment of the invention is depicted. In the depicted microwave doppler module, each ambient sensor node 100 preferably consists of a bi-static microwave doppler transceiver that operates in the X-band. Each node may constantly emit a low-level radio beam at the carrier frequency of 10.525 GHz or any other range including mm wave north of 40 GHz. FIG. 1 shows a block diagram of the sensor node, and includes a Tx antenna 110 and associated oscillator 115, an RX antenna 120, and a mixer 130 for mixing the Tx and Rx antenna signals.

The received signal which typically reflects off objects moving around in the presence of the sensor has a different frequency based on the velocity of the moving object due to the Doppler effect. If $f_t$ represents the transmitted frequency, $f_r$ represents the received frequency, and v represents the velocity of the moving object, the shift in frequency is given by $$f_d = 2v\frac{f_t}{c-v},$$

where c represents the velocity of light. As v<<c, the equation approximates to $$f_d \approx 2v\frac{f_t}{c}.$$

Figure 2A:
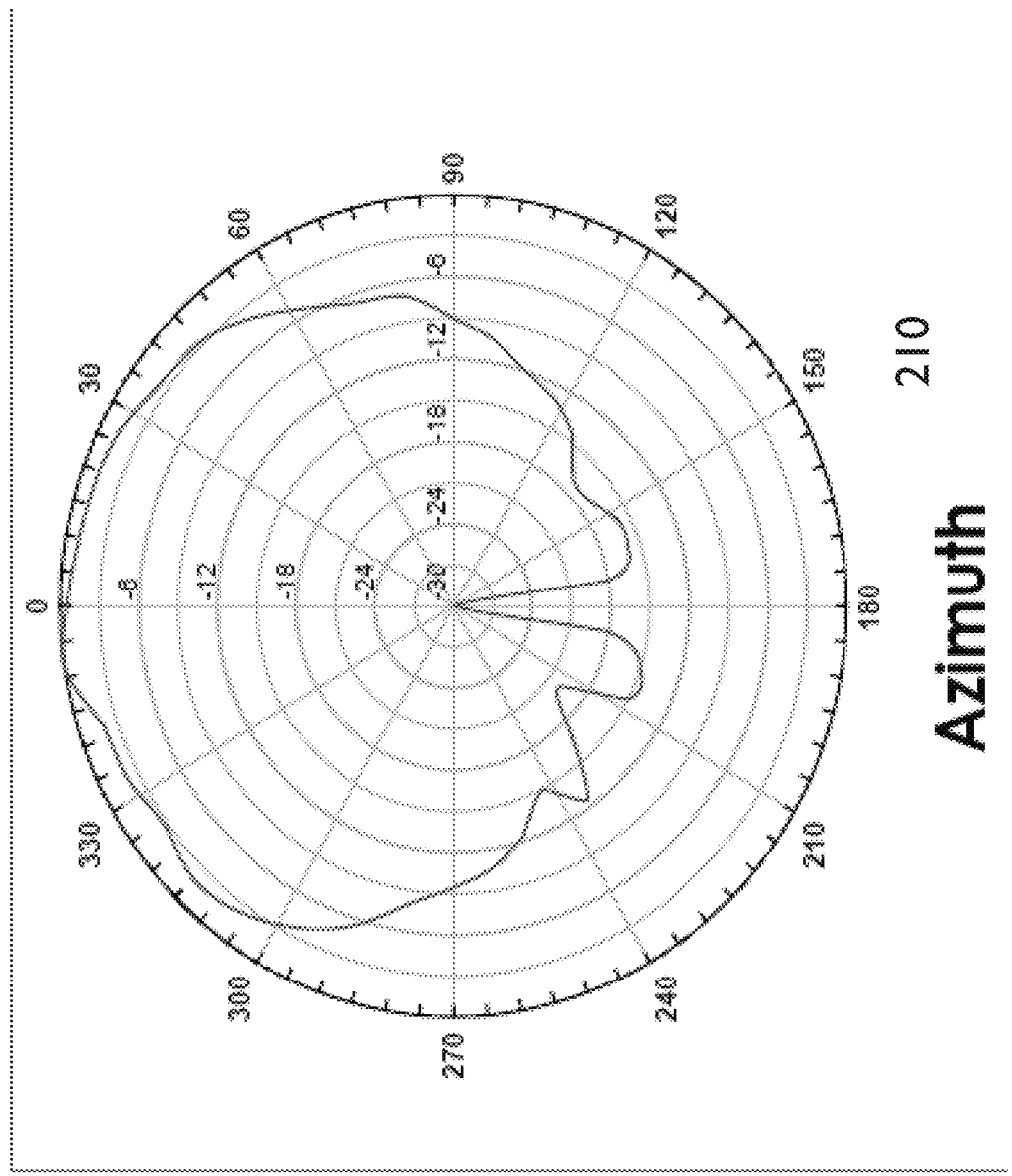
FIGS. 2A and 2B depict an adiation pattern of the microwave doppler module in accordance with an embodiment of the invention.
Figure 2B:
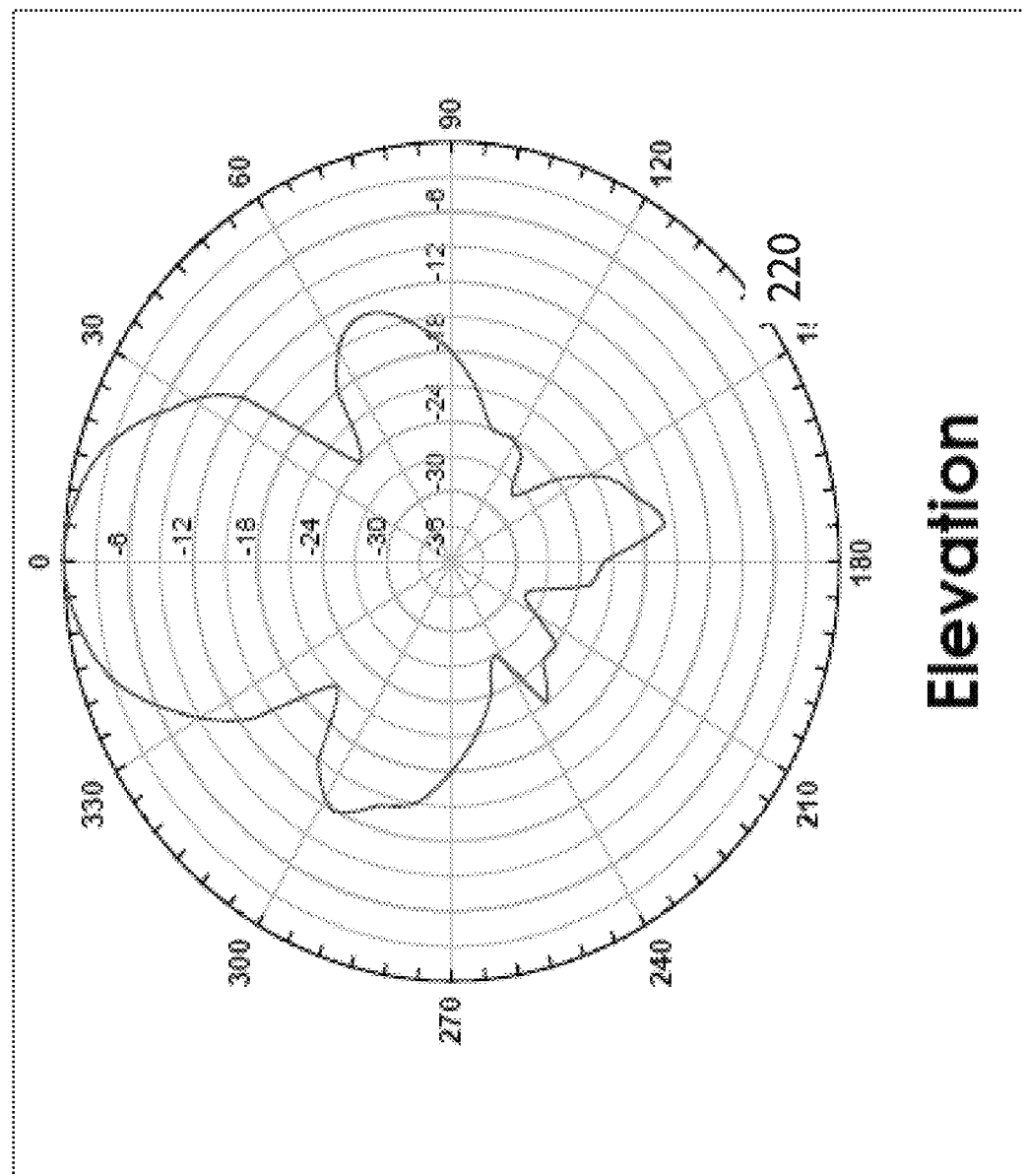

The received signal is then preferably mixed with the original transmitted signal to generate heterodyne frequency pairs $f_r+f_t$ and $f_r-f_r=fa$. The sensitivity of the receiver antenna is maximum in front of the node and drops off as the angle from the center increases as shown in FIG. 2, depicting both azimuth 210 and elevation 220 of the readings in a polar plot.

Signal Controlling Unit

Figure 3:
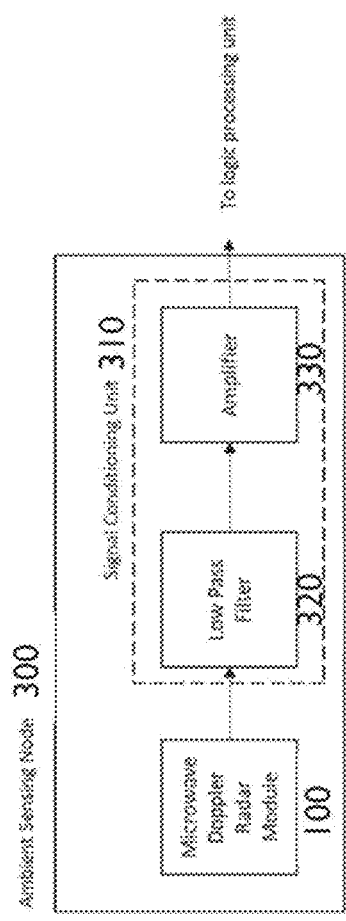
FIG. 3 is a block diagram depicting a signal conditioning unit in accordance with an embodiment of the invention.

The signal returned by the Doppler module is typically in the micro-volt range and contains high frequency random noise. The signal conditioning unit consists of hardware to low-pass filter the signal from the Doppler module and amplify it. The resistive and capacitive components in the signal conditioning unit can be tweaked to improve the signal quality. FIG. 3 depicts a block diagram of the signal conditioning unit in the context of the entire ASN system. As is shown in FIG. 3, the ASN 300 further comprises a microwave doppler radar sensor module 100 (as depicted in FIG. 1), and a signal conditioning unit 310. Signal conditioning unit further comprises a low pass filter 320 and an amplifier 330. The output from ASN 300 is preferably forwarded to a logic processing unit (to be described further below).

Sensor Topology

Figure 4:
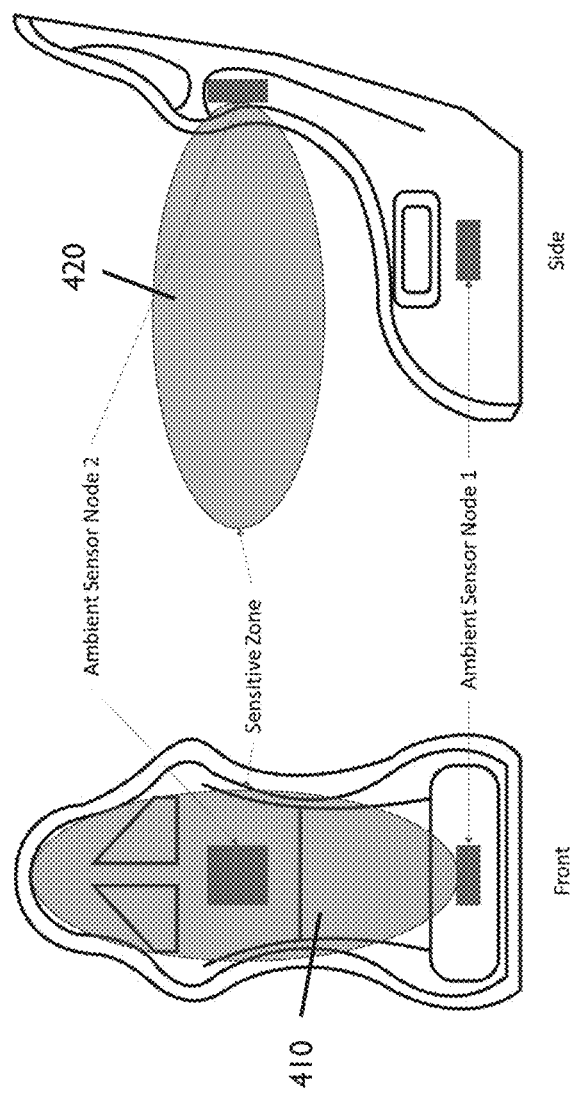
FIG. 4 depicts a sensor topology constructed in accordance with an embodiment of the invention.

To capture coarse and fine movements, a preferred sensor arrangement for a car seat is as shown in FIG. 4 with ambient sensor node 1 placed in the seating area with a corresponding sensitive zone 410 for the sensor node 1 passing through the seating area vertically and ambient sensor node 2 placed in the back rest with a corresponding sensitive zone 420 for the sensor node 2 passing through horizontally near the chest area of the occupant. Ambient sensor node 1 is preferably designed to sense coarse movements happening both inside and outside the vehicle within a radius of 2 feet. On the other hand, ambient sensor node 2 due to its proximity to the chest area, is preferably designed to capture finer movements, such as breathing and heartbeats.

Occupant Detection

In accordance with one or more embodiments of the present invention, the presence of an occupant within the vehicle is equated with the presence of occupant motion. The following two types of motions are considered as part of the occupant detection procedure.

Coarse Movement

Coarse movement comprises motion that involves large displacements generating a high response in the ambient sensing nodes. As a result, thresholds can be applied to detect coarse movement easily for both ambient sensing nodes. Some examples of coarse movement include hand gestures, shifting of body position, and head movements.

Fine Movement

Figure 5:
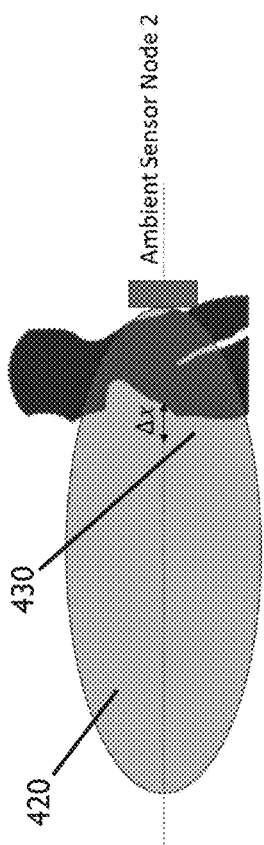
FIG. 5 depicts a method for fine movement detection employing a top sensor as depicted in FIG. 4 in accordance with an embodiment of the invention.

In cases where the occupant within a vehicle is resting, he/she may not generate coarse movements. In such cases, the signal detected by the ambient sensing module 2 which is located in the back rest and has a sensitive zone 420 passing through the chest area of the occupant 430 in a direction parallel to the displacement of the diaphragm, as shown in FIG. 5, can preferably be used.

Spectral analysis of this signal may be used to detect the presence of biometric signatures such as breathing and the presence of a heartbeat. As part of the spectral analysis, first, the Fast Fourier Transform of the N sample signal x(n) may be obtained using Equation 1 from which the squared magnitude frequency response is derived using Equation 2.

$$X(k) = \sum_{n=0}^{N-1} x(n)e^{-j\left(\frac{2\pi}{N}\right)nk}, k = 0, 1, 2, \ldots, N-1 \quad \text{Equation 1}$$

$$M(k) = |X(k)|^2 \quad \text{Equation 2}$$

Figure 6:
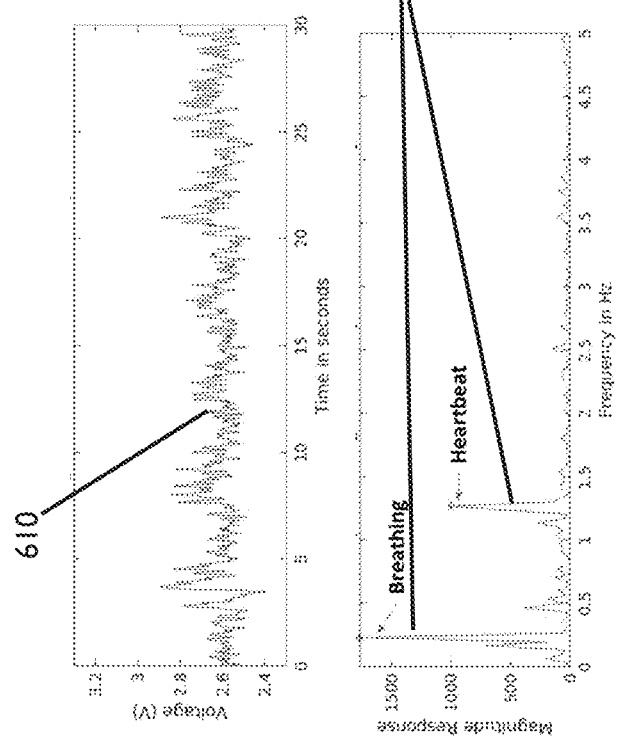
FIG. 6 depicts a signal from a top sensor as depicted in FIG. 4 and corresponding squared magnitude response with dominant peaks marked in accordance with an embodiment of the invention.

Next, all dominant peaks in the squared magnitude frequency response may be detected using a peak finder algorithm to get a list of peak magnitudes $M_{peaks}$ at locations $K_{peaks}$, as is shown in FIG. 6. The signal 610 from sensor 2 (shown in the top graph) and corresponding squared magnitude response with dominant peaks 620 (represented breathing and heartbeat, for example) marked (shown in the bottom graph). FIG. 6 therefore shows a sample signal obtained from sensor 2 when the occupant is resting and no coarse movement is detected, along with the squared magnitude frequency response with dominant responses marked.

In accordance with an embodiment of the invention, the inventors of the present invention have determined that breathing and heartbeat may be detected if a dominant response is found in the frequency ranges 0.2 to 0.5 Hz and 0.8 to 3 Hz, respectively. These ranges correspond to the typical human breathing and heartbeat rates. The breathing rate detected can further be used to detect if the occupant is a child by checking if value obtained for the breathing rate is over 18 breaths per minute based on the typical values listed in Table 1.

TABLE 1

Typical breathing rate ranges for different age groups

| Age | Breathing Rate Range (breaths per minute) |
| --- | --- |
| <6 weeks | 30 to 40 |
| 6 months | 25 to 40 |
| 3 years | 20 to 30 |
| 6 years | 18 to 25 |
| 10 years | 17 to 23 |
| Adults | 12 to 18 |

Overall, an occupant within the vehicle can be detected for the following scenarios: 1) either one or both sensors trigger a large movement; or 2) both sensors don't trigger a large movement, but sensor 2 detects breathing or heartbeat. These sensor outputs are preferably provided to a processor or other data processing apparatus located within the vehicle (although may be located remotely) that may employ a compute program to perform the above processing and to determine the presence of an occupant.

Figure 7:
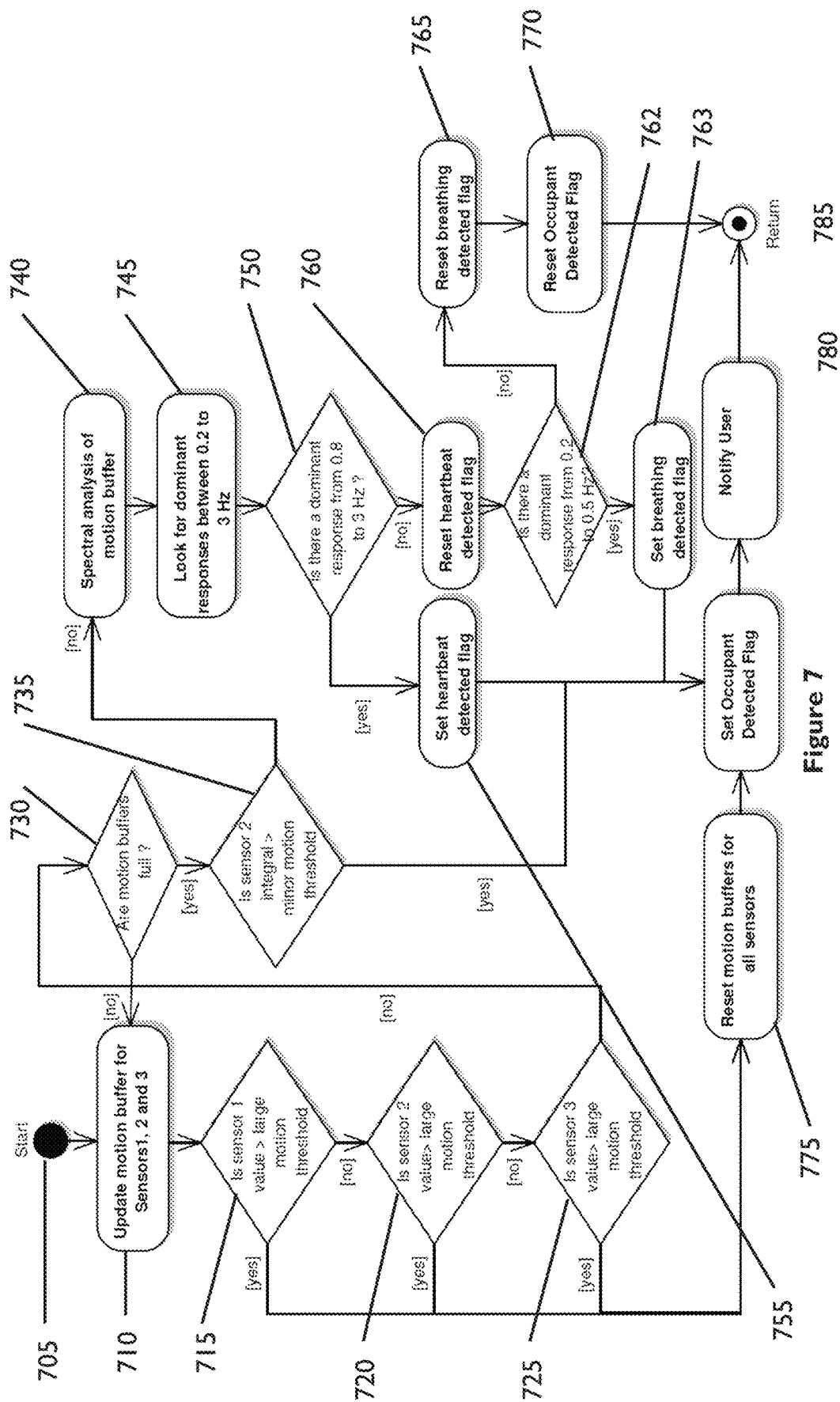
FIG. 7 is a flowchart diagram depicting a process for occupant detection in accordance with an embodiment of the invention.

FIG. 7 depicts a complete flowchart for the occupant detection procedure. As is shown in FIG. 7, processing begins at step 705, and at step 710, a motion buffer is updated preferably for each of motion sensors 1, 2 and 3. Next at step 715 an inquiry is made as to whether sensor 1 has produced a value greater than a threshold indicating a large motion has been sensed. If this query is answered in the negative, and it is therefore determined that a large motion threshold has not been reached with respect to sensor 1, processing moves to step 720 where an inquiry is made as to whether sensor 2 has produced a value greater than a threshold indicating a large motion has been sensed. If this query is answered in the negative, and it is therefore determined that a large motion threshold has not been reached with respect to sensor 2, processing moves to step 750 where an inquiry is made as to whether sensor 3 has produced a value greater than a threshold indicating a large motion has been sensed. If this query is answered in the negative, and it is therefore determined that a large motion threshold has not been reached with respect to sensor 3, processing moves to step 730. On the other hand, if the query at step 715, 720 or 725 is answered in the affirmative, and it is therefore determined that one of the sensors has reached a large motion threshold, processing continues at step 775 where all motion buffers are reset for all of the sensors. Processing continues at step 780 where an "occupant Detected" flag is set, and at step 785, the user is notified. Processing then returns to starting step 705 for a next sensing period.

Referring back to the inquiry at step 730, if it is determined that motion buffers are not all full, processing returns to step 710. If, on the other hand, the inquiry at step 730 is answered in the affirmative, and it is therefore determined that all of the motion buffers are full, processing continues at step 735 where an inquiry is made as to whether sensor 2 has produced a value greater than a threshold indicating a minor motion has been sensed. If this query is answered in the affirmative, and it is therefore determined that a minor motion threshold has been reached with respect to sensor 2, processing passes to step 780 where the "occupant Detected" flag is set, and at step 785, the user is notified. Processing then returns to starting step 705 for a next sensing period.

Referring back to the inquiry at step 735, if it is determined where an inquiry is made as to whether sensor 2 has produced a value greater than a threshold indicating a minor motion has been sensed. If this query is answered in the negative, and it is therefore determined that a minor motion threshold has not been reached with respect to sensor 2, processing moves to step 740. At step 740 a spectral analysis of the motion buffer that is capturing the movement data s performed, and at step 745, the system looks for a dominant response between 0.2 and 3 Hz. An inquiry is then made at step 750 an inquiry is made as to whether there is a dominant response from 0.8 to 3 Hz. If this inquiry is answered in the affirmative, and it is therefore determined that there is a dominant response from 08 to 3 Hz, processing passes to step 755 where a heartbeat flag detected is set, and processing then continues with step 780 where the occupant Detected" flag is set, and at step 785, the user is notified. Processing then returns to starting step 705 for a next sensing period.

Note that the individual nodes may be fitted with custom or modified antennas that can help localize movement as well as location of movement, enabling identification of the location of the occupant.

If on the other hand, the inquiry at step 750 is answered in the negative, and it is determined that there is no dominant response that identified at step 750, processing then passes to step 760 where a heartbeat detected flag is reset. Processing then continues at step 762 where an inquiry is made as to whether there is a dominant response between 0.2 and 0.8 Hz. If this inquiry is answered in the affirmative, and it is therefore determined that there is such a dominant response, processing passes to step 763 where a breathing detected flag is set. Processing then passes to step 780 where the "occupant Detected" flag is set, and at step 785, the user is notified. Processing then returns to starting step 705 for a next sensing period.

If on the other hand, the inquiry at step 762 is answered in the negative and it is determined that such a dominant response is not recognized, processing is passed to step 765 where a breathing detected flag is reset, and then to step 770 where an occupant detected flag is reset. Processing then returns to step 705.

Artificial Intelligence Layer

Figure 8:
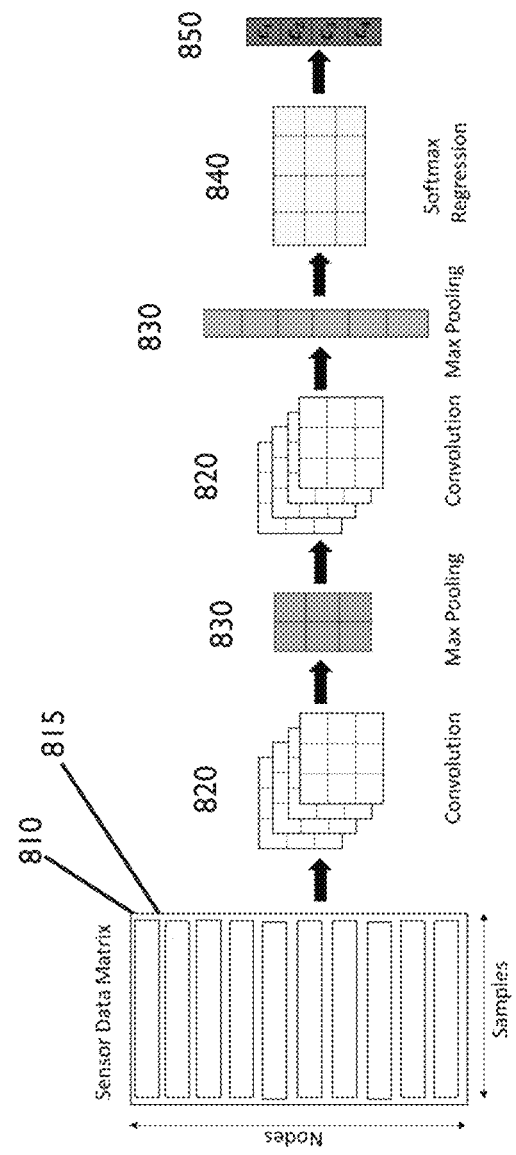
FIG. 8 depicts a deep learning framework for analyzing sensor data in accordance with an embodiment of the invention.

Such a two-node sensor network can be replicated for multiple seats and all of the sensor readings can be considered as a multi-channel input that can be fed into a deep learning network that can be trained to detect the presence of multiple occupants with better localization and more reliability. The network can also be trained to recognize the types of movements-coarse such as moving or breathing, or fine, such as heartbeats. It can also be trained to recognize parasitic signals. This is unique in that the algorithms no longer are deterministic or hard coded or manually coded, but rather, trained on a network of nodes with different fields of views and capabilities to detect various types of movement. These nodes individually also have various weaknesses. By training an AI on this challenge, the system is able to detect these behaviors in an approach that is not feasible in the state of the art. FIG. 8 illustrates the process with the input consisting of a data matrix 810 comprising of stacked samples 815 from different sensor locations. The data matrix is then passed through a standard convolutional neural network (CNN) 820 which consists of several iterations of convolution followed by max pooling 830. The final Softmax layer 840 outputs class probabilities. The different classes can be set up to encapsulate the different states of the system. As an example, the mapping shown in Table 2 of the different states of the system can be mapped to the four classes illustrated in FIG. 8.

TABLE 2

Sample class mapping to system states

| Class | Description |
|---|---|
| $C_1$ | Occupant detected with coarse movement |
| $C_2$ | Occupant detected with fine movement |
| $C_3$ | No occupant detected |
| $C_4$ | Motion outside vehicle |

Therefore, in accordance with one or more preferred embodiments of the invention, it has been determined that living beings and pets have physical biometric signatures that can be trained via a meshed network of Ambient Sensing Doppler nodes. These nodes may then be used to detect user movements. Biometric signature detection may further be using Doppler radar, and in turn, deep learning for sensor networks may be used to better identify and characterize input elements. Note that a single node may have to deal with multiple challenges, including reflection from metal objects that it cannot traverse or parasitic noise from emitters within the same bandpass of frequencies. Having more than one sensor allows for an intelligent learning framework that can intelligently track and identify different movements.

In accordance with various embodiments of the invention, the term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application specific integrated circuit) or an AI chip embedded in-vehicle or as part of a CPU. The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random-access memory or both. Specialized chips may be embedded on processors with near-memory features, i.e. AI processors, or memory chips that have AI built into them. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of any subject matter described in this disclosure or on the scope of what may be claimed, but rather as descriptions of features that may be specific to particular embodiments of the subject matter described in this disclosure. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

Still other objects and advantages of the invention will in part be obvious and will in part be apparent from the specification and drawings.

The invention accordingly comprises the several steps and the relation of one or more of such steps with respect to each of the others, and the apparatus embodying features of construction, combinations of elements and arrangement of parts that are adapted to affect such steps, all as exemplified in the following detailed disclosure, and the scope of the invention will be indicated in the claims.

What is claimed:

1. A non-transitory recording medium having a computer program stored thereon which when run causes a computer to determine the presence of an occupant and to train an artificial intelligence neural network, by performing the steps comprising:
    receiving a first signal from a first sensor positioned within a seating area of a seat and having a corresponding sensitive zone passing through the seating area vertically, the first sensor being adapted to sense coarse movements adjacent to and farther from the sensor;
    determining whether the first signal includes a value greater than a coarse motion threshold;
    receiving a second signal from a second sensor positioned within a back rest area of the seat and having a corresponding sensitive zone passing through a chest area of an occupant horizontally, the second sensor sensing at least one or more fine movements of an occupant, the one or more fine movements being selected from the group of heartbeat and breathing;
    determining whether the second signal includes a value greater than a coarse motion threshold;
    if it is determined that either the first signal or the second signal is greater than the coarse motion threshold, indicating that an occupant is present;
    if it is determined that neither the first signal nor the second signal is greater than the coarse motion threshold, then determining whether the second signal includes a value that is greater than the fine motion threshold, further comprising the steps of:
        determining whether the second signal includes a value that is greater than the fine motion threshold further comprises:
        performing a spectral analysis on the second signal;
        determining whether there is a dominant response between 0.8 and 3 Hz;
        if it is determined that there is a dominant response between 0.8 and 3 Hz, thus indicating the presence of a heartbeat, indicate that an occupant is present;
        if it is determined that there is no dominant response between 0.8 and 3 Hz, determining whether there is a dominant response between 0.2 to 0.5 Hz;
        if it is determined that there is a dominant response between 0.2 and 0.5 Hz, thus indicating the presence of breathing, indicate that an occupant is present; and
    if there is no dominant response between 0.2 and 0.5 Hz or between 0.8 and 3 Hz, indicate that no occupant is present;
    processing a plurality of sensor samples in accordance with a convolutional neural network; and
    outputting one or more class probabilities from a final neural network layer, the classes being used to encapsulate a plurality of different states of the system to be employed by the artificial intelligence neural network.

2. The non-transitory recording medium of claim 1, wherein the step of determining whether the second signal includes a value that is greater than the fine motion threshold further comprises one or more iterations of convolution followed by generation of a layer of max pooling.

3. The non-transitory recording medium of claim 1, wherein the computer program is further trained to recognize one or more present parasitic signals from one or more of the first and second sensors.

4. The non-transitory storage medium of claim 1, wherein the seat is positioned within a vehicle.

5. The non-transitory storage medium of claim 1, wherein the plurality of sensor samples are provided as a data matrix to the convolutional neural network.

* * * * *